(12) United States Patent
Shestak et al.

(10) Patent No.: US 7,648,243 B2
(45) Date of Patent: Jan. 19, 2010

(54) STEREOSCOPIC PROJECTION SYSTEM

(75) Inventors: Sergey Shestak, Suwon-si (KR); Kyung-hoon Cha, Yongin-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 412 days.

(21) Appl. No.: 11/294,381

(22) Filed: Dec. 6, 2005

(65) Prior Publication Data

US 2006/0170869 A1    Aug. 3, 2006

(30) Foreign Application Priority Data

Jan. 31, 2005    (KR) ...................... 10-2005-0008748

(51) Int. Cl.
| | |
|---|---|
| G03B 21/00 | (2006.01) |
| G03B 21/14 | (2006.01) |
| G03B 21/16 | (2006.01) |
| G03B 21/60 | (2006.01) |
| G02B 27/22 | (2006.01) |
| G02B 5/124 | (2006.01) |
| G02B 5/02 | (2006.01) |
| G02B 13/20 | (2006.01) |

(52) U.S. Cl. ............................. 353/7; 353/10; 353/48; 353/69; 353/70; 353/94; 359/458; 359/463; 359/530; 359/599

(58) Field of Classification Search ...................... 353/7, 353/10, 48, 69, 70, 94; 359/599, 619, 463, 359/456; 345/419; 362/327
See application file for complete search history.

(56) References Cited

U.S. PATENT DOCUMENTS

| | | | | |
|---|---|---|---|---|
| 4,526,439 | A | * | 7/1985 | Okoshi et al. ............... 359/458 |
| 4,799,739 | A | | 1/1989 | Newswanger ............... 350/3.7 |
| 5,382,990 | A | * | 1/1995 | Hata et al. .................... 353/94 |
| 5,615,045 | A | * | 3/1997 | Takuma et al. .............. 359/456 |
| 5,649,752 | A | * | 7/1997 | Shioya ......................... 353/94 |
| 6,081,380 | A | * | 6/2000 | Ohshima et al. ............ 359/599 |

(Continued)

FOREIGN PATENT DOCUMENTS

FR        2770651        5/1999

(Continued)

OTHER PUBLICATIONS

"Multiview 3D Projection System", Kim et al., pp. 222-226, SPIE vol. 5291, 2004.*

(Continued)

*Primary Examiner*—Melissa J Koval
(74) *Attorney, Agent, or Firm*—Stanzione & Kim, LLP

(57) ABSTRACT

A stereoscopic projection system is capable of minimizing a distance between viewing zones without reducing a distance between image projectors. In the stereoscopic projection system, a projector array having a plurality of image projectors are arranged substantially along an arrangement direction perpendicular to a connecting line between a left eye and a right eye of a viewer, and a directional screen has a first characteristic axis aligned at an angle with respect to the arrangement direction of the projector array, and a second characteristic axis perpendicular to the first characteristic axis. Therefore, the directional screen causes a plurality of images projected from the projector array to be relatively widened along the first characteristic axis and relatively narrowed along the second characteristic axis.

21 Claims, 9 Drawing Sheets

U.S. PATENT DOCUMENTS

| | | | |
|---|---|---|---|
| 6,128,132 A | 10/2000 | Wieland et al. | 359/463 |
| 6,508,555 B1* | 1/2003 | Sugawara | 353/69 |
| 6,513,938 B2* | 2/2003 | Kubota et al. | 353/94 |
| 6,795,241 B1 | 9/2004 | Holzbach | 359/463 |
| 6,984,043 B2* | 1/2006 | Nakamura et al. | 353/94 |
| 2005/0190180 A1* | 9/2005 | Jin et al. | 345/419 |
| 2006/0066810 A1* | 3/2006 | Shestak | 353/7 |

FOREIGN PATENT DOCUMENTS

| | | |
|---|---|---|
| JP | 4-3046 | 1/1992 |
| JP | 7-28178 | 1/1995 |
| JP | 10-211795 | 8/1998 |
| JP | 11-249236 | 9/1999 |
| JP | 2002-27494 | 1/2002 |
| JP | 2003-279894 | 10/2003 |
| WO | 01/06299 | 1/2001 |

OTHER PUBLICATIONS

"Stereoscopic display employing head-position tracking using large format lenses", Hattori, SPIE vol. 1915, 4 pages, 1993.*

Takanori Okoshi, "Three-Dimensional Imaging Techiniques," Academic Press New York, San Francisco, London, 1976 (pp. 138-142).

Jung-Young Son, et al., "Autostereoscopic Imaging Systems Based on Holographic Screen," SPIE Proceedings, vol. CR76, 2001 (pp. 30-60).

Netherlands Search Report issued Apr. 3, 2009 in NL Patent Application No. 1030791.

* cited by examiner

STEREOSCOPIC PROJECTION SYSTEM

CROSS-REFERENCE TO RELATED APPLICATIONS

This application claims the benefit under 35 U.S.C. §119 from Korean Patent Application No. 2005-8748, filed on Jan. 31, 2005, in the Korean Intellectual Property Office, the disclosure of which is incorporated herein in its entirety by reference.

BACKGROUND OF THE INVENTION

1. Field of the Invention

The present general inventive concept relates to a stereoscopic projection system with a plurality of projectors, and more particularly, to a stereoscopic projection system that is capable of minimizing a distance between viewing zones without narrowing a distance between image projectors and controlling the distance between the viewing zones of the image projectors.

2. Description of the Related Art

Stereoscopy has been widely researched as a way of displaying a stereoscopic image with a stereoscopic projection system. In the stereoscopy, two images representing two perspectives of the same object are respectively provided to left and right eyes of a viewer to create a three-dimensional image. Since the stereoscopy utilizes a pair of two-dimensional images, it provides an easy way of displaying the three-dimensional image with a high resolution and a high depth perception.

An autostereoscopic display is a type of the stereoscopy devices, which provides the three-dimensional image to the viewer without requiring the viewer to wear additional tools such as special glasses. In the autostereoscopic display, the viewer should be positioned at a viewer position, where a left-eye image and a right-eye image can be respectively provided to the left and right eyes of the viewer, for a three-dimensional viewing.

When the autostereoscopic display provides a plurality of views with a plurality of projectors, different stereoscopic images can be seen from different viewer positions within a viewing area. For example, the viewer can see the different stereoscopic images sequentially by changing his/her position within the viewing area.

The autostereoscopic display is disclosed in the following references:

1) Takanori Okoshi, "Three-Dimensional Imaging Techniques," Academic Press New York, San Francisco, London, 1976 (hereinafter 'Okoshi');

2) U.S. Pat. No. 4,799,739, issued to C. Newswanger and entitled "Real time autostereoscopic display using holographic diffusers"; and 3) J-Y. Son, V. Bobrinev, "Autostereoscopic imaging systems based on holographic screen," SPIE Proceedings, Vol. CR76, pp. 30-60, 2001.

FIG. 1 is a plan view schematically showing a conventional autostereoscopic projection system that can project a plurality of images (multi-view), as disclosed in Okoshi.

Referring to FIG. 1, a plurality of projectors $P_1, P_2 \ldots P_M$ are horizontally arranged from a right side to a left side as seen by a viewer 35 to form a projector array 10, and a screen 20 is interposed between the viewer 35 and the projector array 10. The projector array 10 receives image signals of an object 0 from a camera array 1 to project a plurality of images on the screen 20. The camera array 1 includes a plurality of cameras $P'_1, P'_2 \ldots P'_M$ that correspond to the projectors $P_1, P_2 \ldots P_M$, respectively. That is, the camera array 1 takes pictures of the object 0 from different angles and converts the pictures into the respective image signals, to provide the plurality of images to form a stereoscopic image of the object 0.

The screen 20 is a directional screen with a horizontal directivity. The screen 20 includes a condenser lens 21 and a one-dimensional diffuser 25. The condenser lens 21 condenses the plurality of images that are simultaneously projected by the projectors $P_1, P_2 \ldots P_M$ of the projector array 10. The one-dimensional diffuser 25 diffuses the incident images in a vertical direction while maintaining the horizontal directivity of the screen 20 to increase a degree of freedom in the vertical direction of the screen 20. Therefore, the viewer 35 can view the plurality of images projected on the screen 20 by locating his/her eye pupils at an exit pupil position 31 (viewer position) spaced a distance $L_V$ apart from the screen 20. FIG. 2 shows a plurality of screen images $I_1, I_2 \ldots I_M$ viewed from the viewer position (exit pupil position 31) of the conventional autostereoscopic projection system of FIG. 1. Referring to FIGS. 1 and 2, the plurality of images $I_1, I_2 \ldots I_M$, which are respectively projected from the projectors $P_1, P_2 \ldots P_M$ of the projector array 10, are arranged in a horizontal direction (X) with a distance $S_V$ therebetween, showing a vertical diffusion due to the diffuser 25 and the horizontal directivity. The viewer 35 can view the different images of the same object 0 while changing his/her location.

The distance $S_V$ is equal to a distance $S_P$ (shown in FIG. 1) between the projectors multiplied by a magnifying power K ($S_V = K \cdot S_P$). The distance $S_V$ should be set below an average distance between eyes of persons (65 mm), to provide stable three-dimensional images to the viewer. The magnifying power K denotes a magnification ratio of the autostereoscopic projection system, and it is given by an equation: $K = L_V/L_P$, where $L_V$ is a viewing distance between the screen 20 and the exit pupil position 31 and $L_P$ is a projecting distance between the projector array 10 and the screen 20. It may be assumed that the distance $S_V$ between the images is equal to the distance between viewing zones.

In the case of a multi-view display using a plurality of projectors, the distance $S_V$ is required to be below 3 mm to allow smooth change of the sequential images when the viewer changes his/her location.

In the conventional autostereoscopic projection system as shown in FIGS. 1 and 2, however, it is hard to reduce the distance $S_V$ to be bellow 3 mm to allow smooth change of the sequential images when the viewer changes his/her location, because the distance $S_V$ is proportional to the distance $S_P$ between projectors ($S_V = K \cdot S_P$) and $S_P$ is about 100 mm. The distance $S_V$ can be adjusted to satisfy the above requirement by increasing inversed magnifying power 1/K above 30. In this case, however, the distance $L_P$ becomes much larger than the distance $L_V$ (30 times or more), thereby increasing a size of the conventional autostereoscopic projection system excessively. Therefore, the requirement to decrease the distance $S_V$ to allow smooth change of the sequential images when the viewer changes his/her location cannot be achieved with the conventional autostereoscopic projection system.

SUMMARY OF THE INVENTION

The present general inventive concept provides a stereoscopic projection system, which is capable of minimizing a distance between viewing zones without reducing a distance between image projectors. Also, the stereoscopic projection system is capable of adjusting the distance between the viewing zones for smooth image change without rearranging the image projectors.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a stereoscopic projection system including a projector array having a plurality of image projectors arranged substantially along an arrangement direction perpendicular to a connecting line between left and right eyes of a viewer, and a directional screen having a first characteristic axis aligned at an angle to arrangement direction of the projector array and a second characteristic axis perpendicular to the first characteristic axis to cause a plurality of images projected from the projector array to be relatively widened along the first characteristic axis, and relatively narrowed along the second characteristic axis.

The image projectors may be arranged to project the plurality of images at exit pupils positions spaced apart from each other by a pitch, and an angle of the first characteristic axis with respect to the arrangement direction of the projector array may satisfy an equation:

$$\phi = \pm\tan^{-1}\left\{\frac{P'_D}{K' \cdot P'_A}\right\}$$

where $\phi$ is the angle of the first characteristic axis with respect to the arrangement direction of the projector, $P'_D$ is a distance between viewing zones, $K'$ is a magnification power of the directional screen, and $P'_A$ is a distance between the image projectors. The foregoing and other aspects of the present general inventive concept may also be achieved by providing a stereoscopic projection system including a projector array having a plurality of image projectors arranged in an arrangement direction to generate a plurality of images, and a directional screen to receive the images, and to widen the images in a first characteristic axis having a first angle with the arrangement direction, and to narrow the images in a second characteristic direction having a second angle with the arrangement direction.

The foregoing and other aspects of the present general inventive concept may also be achieved by providing a stereoscopic projection system including a projector array having a plurality of image projectors arranged in an arrangement direction to generate a plurality of images, and a directional screen to receive the images, and to control the images to be diffused in a first characteristic axis having a first angle with the arrangement direction and not to be diffused in a second characteristic axis having a second angle with the arrangement direction.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
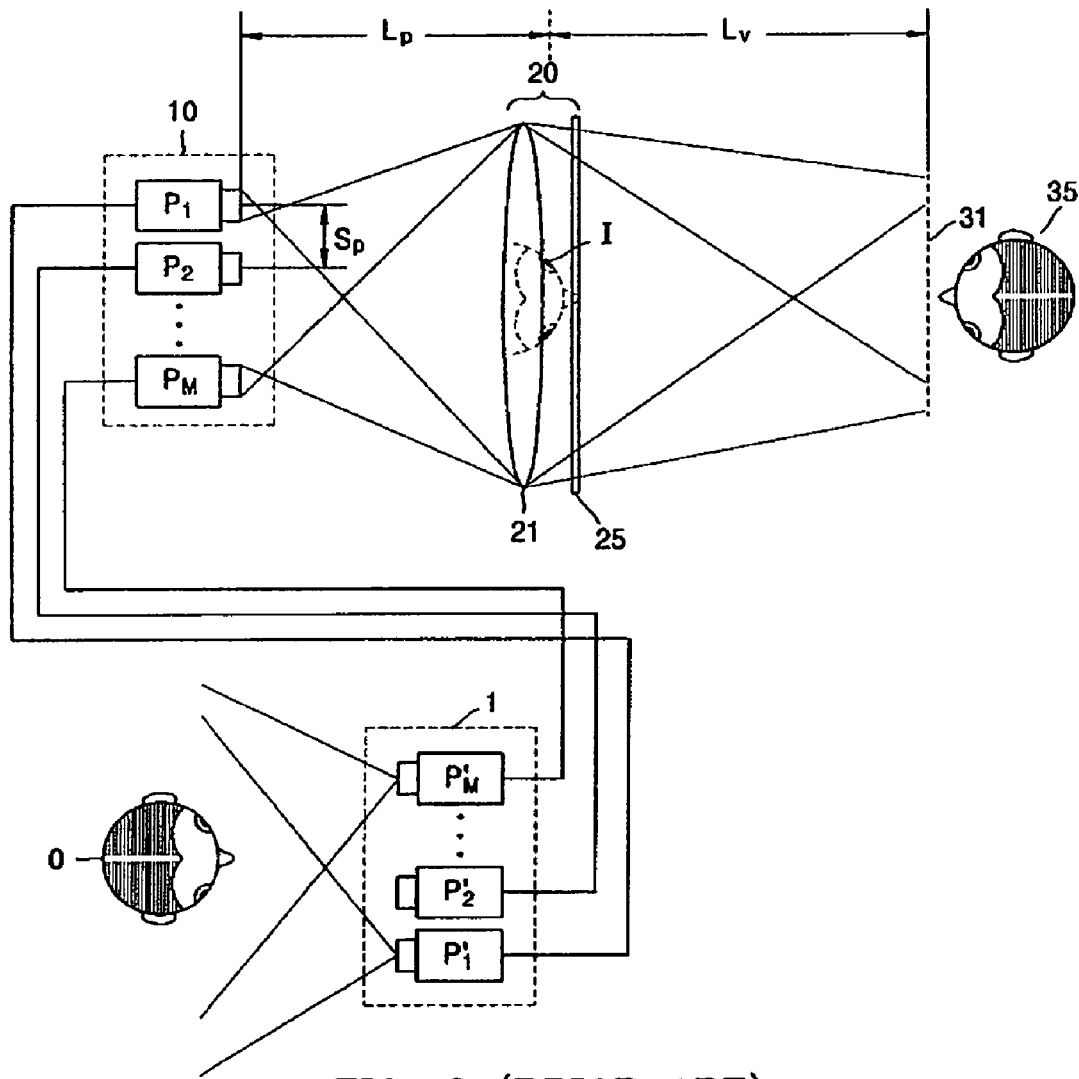
FIG. 1 is a schematic view of a conventional stereoscopic projection system.
Figure 2:
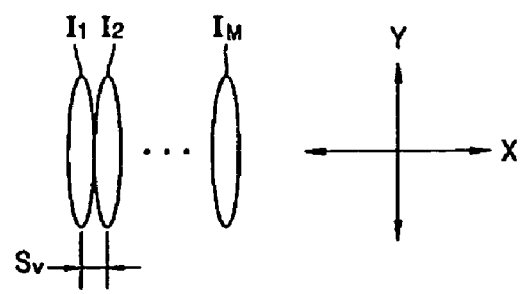
FIG. 2 shows a screen image viewed from an exit pupil position of the conventional stereoscopic projection system of FIG. 1.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 3:
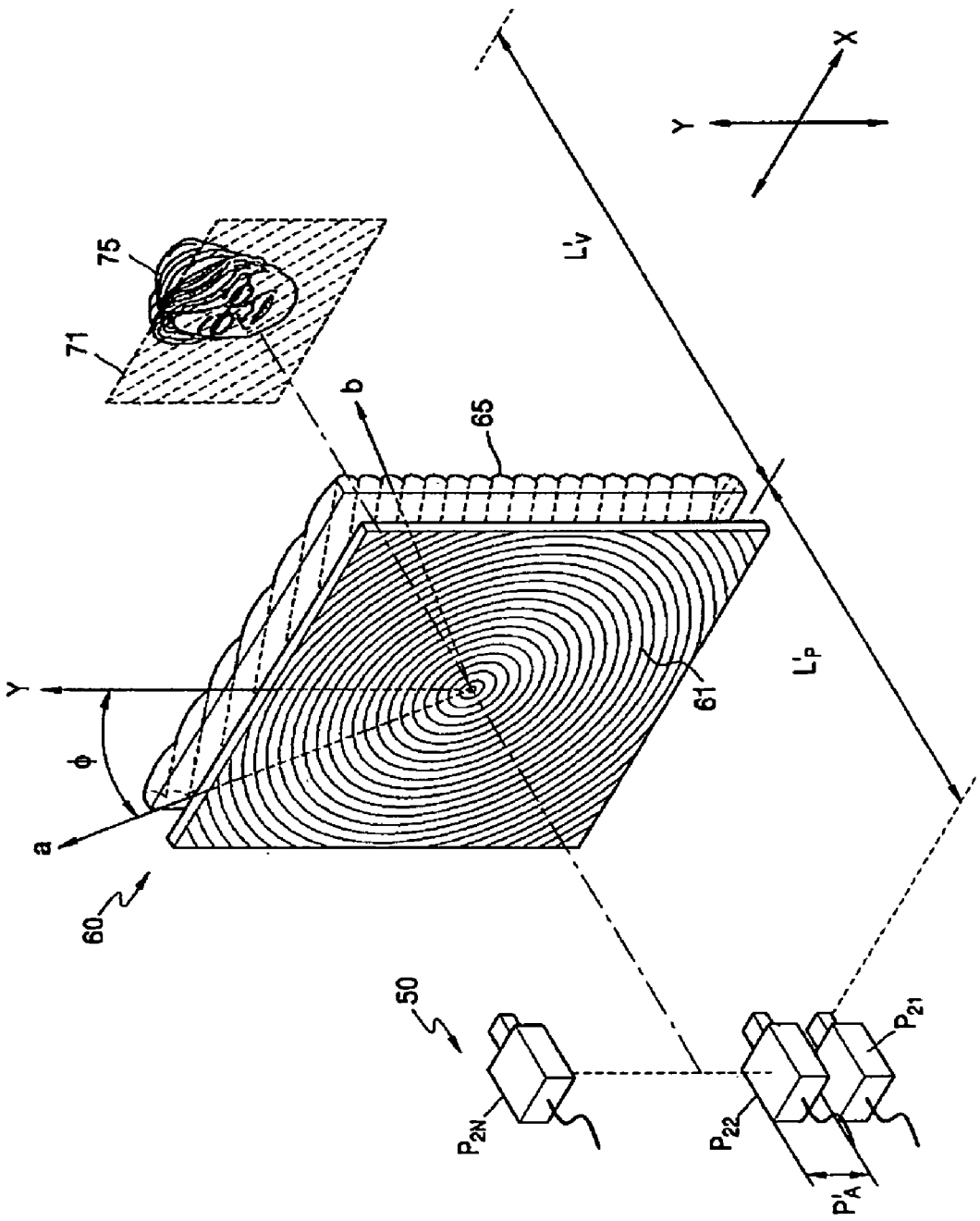
FIG. 3 is a schematic perspective view of a stereoscopic projection system according to an embodiment of the present general inventive concept.

FIG. 3 is a schematic perspective view of a stereoscopic projection system according to an embodiment of the present general inventive concept.

Referring to FIG. 3, the stereoscopic projection system includes a projector array 50 and a directional screen 60. The projector array 50 includes a plurality of image projectors $P_{21}, P_{22} \ldots P_{2N}$, aligned along an arrangement direction, and the directional screen 60 has directivity in a direction inclined with respect to the arrangement direction of the image projectors $P_{21}, P_{22} \ldots P_{2N}$.

A viewer 75 faces the image projectors $P_{21}, P_{22} \ldots P_{2N}$ through the screen 60 disposed therebetween. Also, the image projectors $P_{21}, P_{22} \ldots P_{2N}$ are arranged along the arrangement direction or a line substantially perpendicular to a connecting line between left and right eyes of a viewer 75. The arrangement direction may be parallel to a Y-axis and the connecting line may be parallel to an X-axis. The projector array 50 receives image signals of an object from a camera array (not shown) or from a graphic processing unit, and the projector array 50 projects a plurality of images capable of providing a three-dimensional image to the viewer 75 through the directional screen 60. The image projectors $P_{21}, P_{22} \ldots P_{2N}$ are spaced apart from each other by a pitch $P_A'$.

The directional screen 60 defines a first characteristic axis (a) and a second characteristic axis (b). The first characteristic axis (a) is inclined at an angle $\phi$ with respect to the arrangement direction of the image projectors $P_{21}, P_{22} \ldots P_{2N}$. The second characteristic axis (b) is perpendicular to the first characteristic axis (a). When the images projected from the projector array 50 are formed on the directional screen 60, each image is widened in the direction of the first characteristic axis (a) and narrowed in the direction of the second characteristic axis (b).

Figure 4:
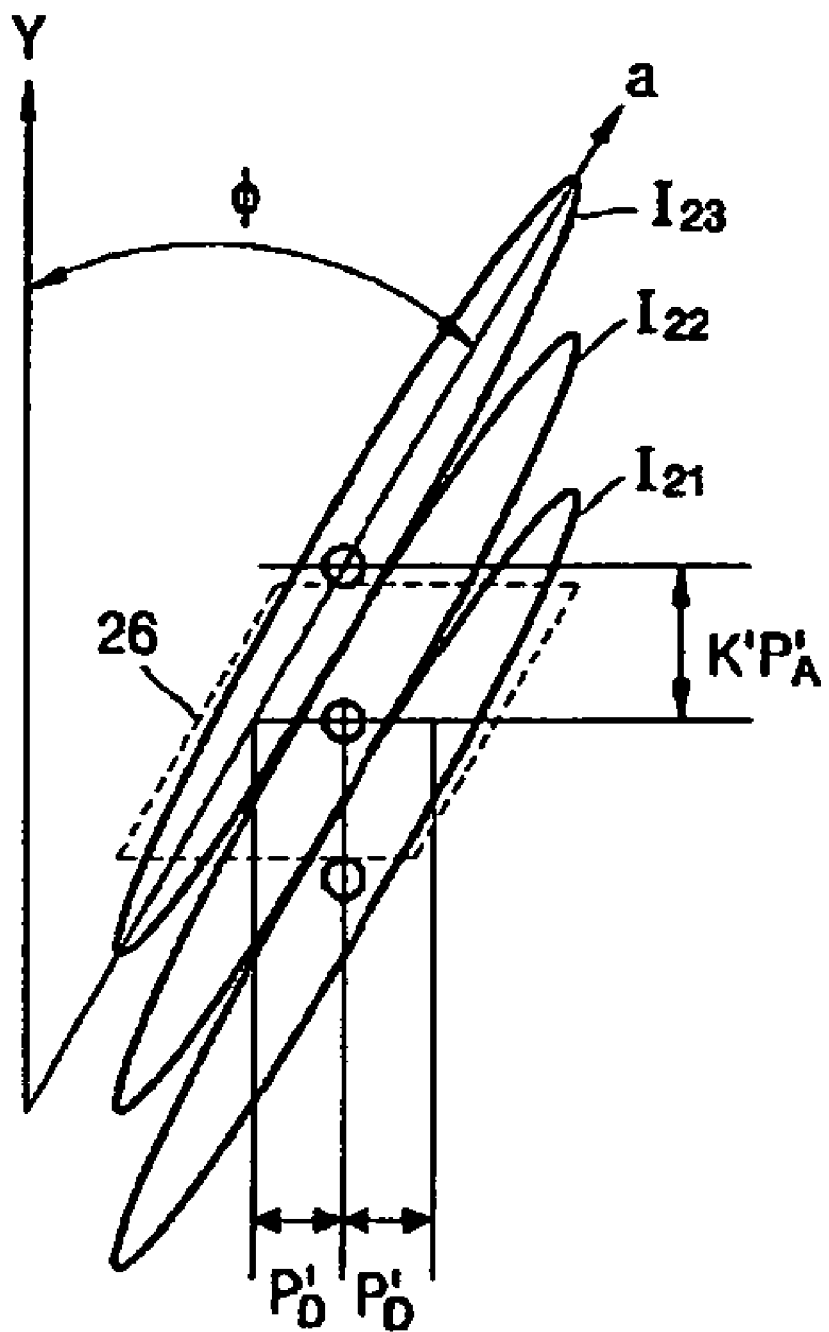
FIG. 4 shows a screen image viewed from an exit pupil position of the stereoscopic projection system of FIG. 3.

FIG. 4 shows a screen image viewed from an exit pupil position 71 of the stereoscopic projection system depicted in FIG. 3.

Referring to FIGS. 3 and 4, the viewer 75 at the exit pupil position 71 can view images $I_{21}$, $I_{22}$, and $I_{23}$ formed on the directional screen 60. The images $I_{21}$, $I_{22}$, and $I_{23}$ have elliptical shapes that have a major axis inclined at an angle φ with respect to the arrangement direction of the image projectors $P_{21}$, $P_{22}$ ... $P_{2N}$. That is, the images $I_{21}$, $I_{22}$, and $I_{23}$ are aligned with the first characteristic axis (a). The images $I_{21}$, $I_{22}$, and $I_{23}$ are adjoined to each other such that a viewing zone distance $P_D'$ is defined therebetween. A minimum distance between centers of the images $I_{21}$, $I_{22}$, and $I_{23}$ is equal to a magnifying power K' multiplied by the pitch $P_A'$ ($K' \cdot P_A'$). The magnifying power K' is equal to a viewing distance $L_V'$ divided by a projecting distance $L_P'$ ($K'=L_V'/L_P'$). The viewing distance $L_V'$ is a distance between the exit pupil position 71 and the directional screen 60, and the projecting distance $L_P'$ is the distance between the projector array 50 and the directional screen 60, as illustrated in FIG. 3.

Embodiments of the directional screen 60 are illustrated in FIG. 3 and FIGS. 5 through 8 in which the first and second characteristic axis (a) and (b) directions are defined as described above.

Figure 5:
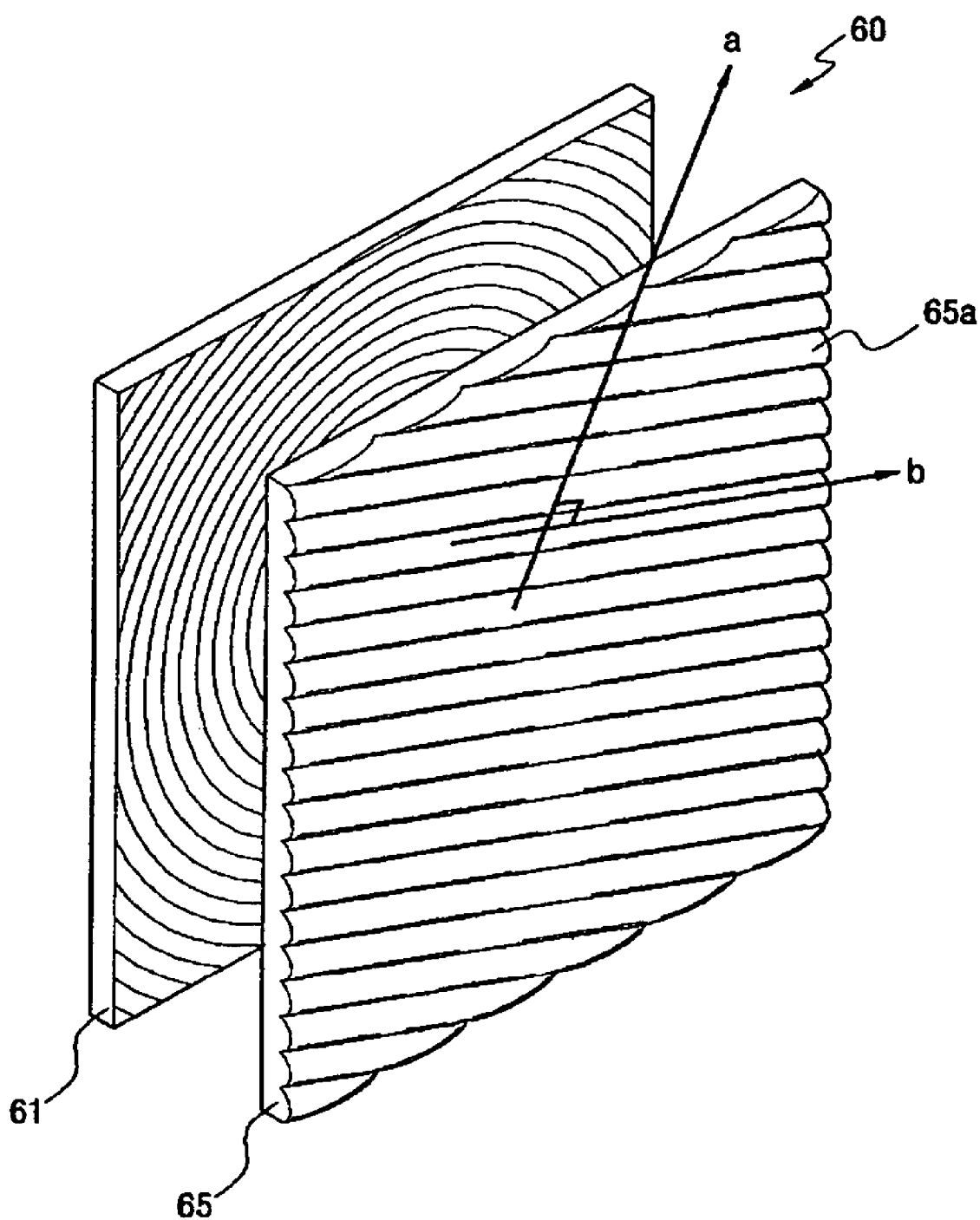
FIG. 5 is a schematic perspective view of a directional screen of a stereoscopic projection system according to an embodiment of the present general inventive concept.

FIG. 5 is a schematic perspective view of a directional screen 60 of a stereoscopic projection system according to an embodiment of the present general inventive concept.

Referring to FIGS. 3 and 5, the directional screen 60 includes a Fresnel lens 61 and a lenticular sheet 65 disposed beside the Fresnel lens 61.

The Fresnel lens 61 condenses the images projected from the projector array 50. The Fresnel lens 61 is a flat type condenser lens having a size and weight smaller than a typical convex lens. The directional screen 60 may include one or more Fresnel lenses 61. Although only one Fresnel lens is used as shown in FIG. 5, a combination of Fresnel lenses can be used.

The lenticular sheet 65 diffuses the images condensed at the Fresnel lens 61 along the first characteristic axis (a). For this purpose, the lenticular sheet 65 includes a plurality of adjoining cylinder lenses 65a that are positioned in a lengthwise direction. The lengthwise direction may be parallel to the second characteristic axis (b). In other words, the cylinder lenses 65a are stacked along the first characteristic axis (a). Each of the cylinder lenses 65a transmits incident images unchanged along the second characteristic axis (b) and condenses and diffuses the incident images along the first characteristic axis (a). That is, after passing through the cylinder lenses 65a, each image is widen in the direction of the first characteristic axis (a) and narrowed in the direction of the second characteristic axis (b) as shown in FIG. 4, due to the diffusion operation of the cylinder lenses 65a along the first characteristic axis (a).

Figure 6A:
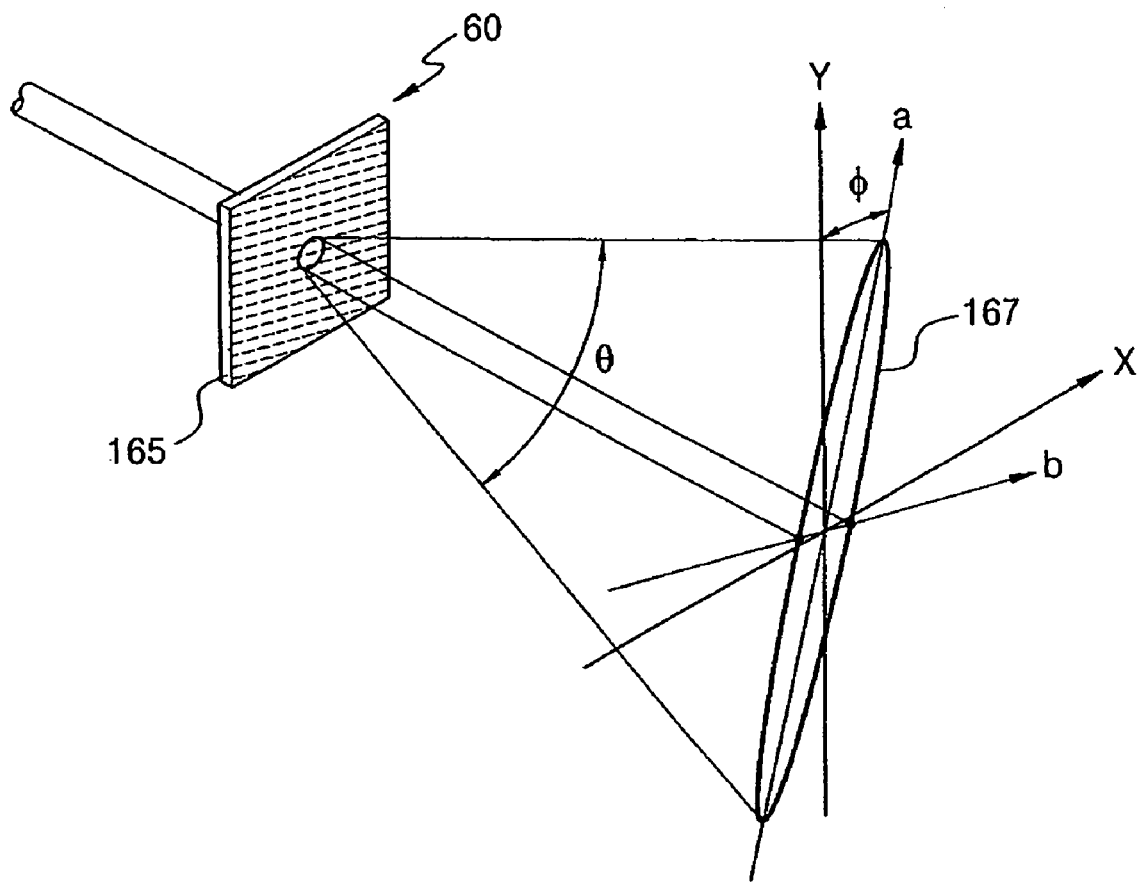
FIG. 6A is a schematic perspective view of a directional screen of a stereoscopic projection system according to another embodiment of the present general inventive concept.
Figure 6B:
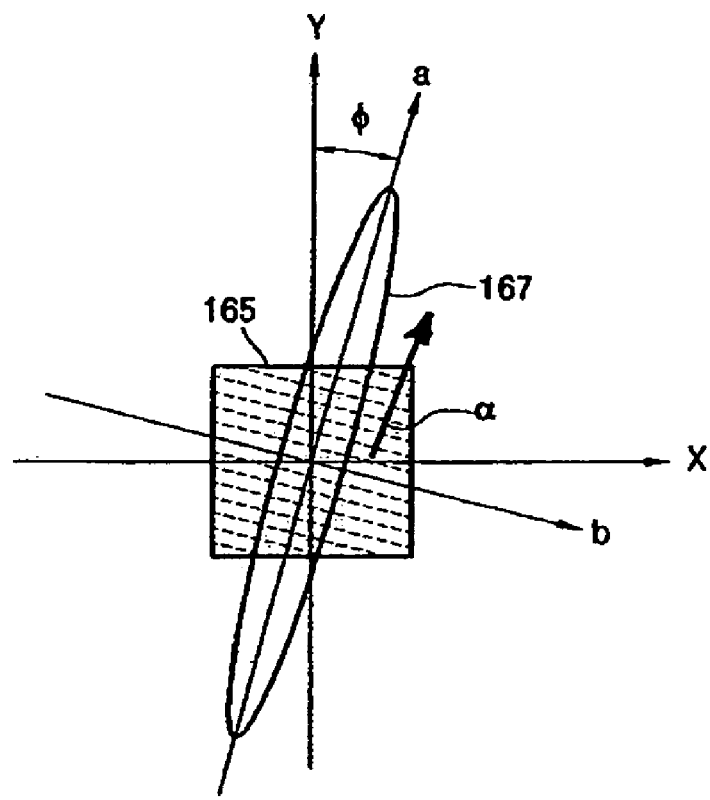
FIGS. 6B and 6C show diffusion directions of a holographic diffuser of the stereoscopic projection system of FIG. 6A.
Figure 6C:
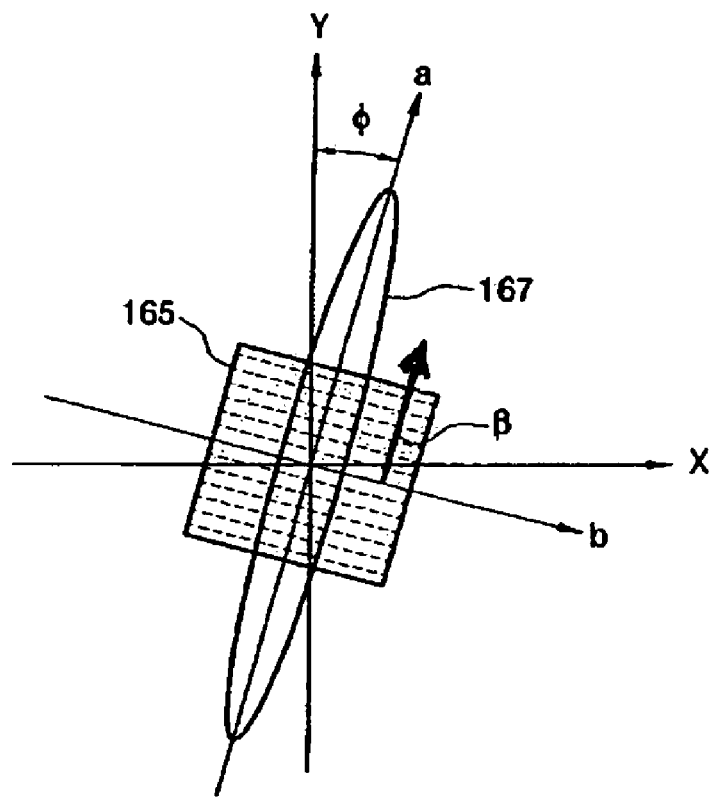

FIG. 6A is a schematic perspective view of a directional screen 60 of a stereoscopic projection system according to another embodiment of the present general inventive concept, and FIGS. 6B and 6C show diffusion directions of a holographic diffuser 165 of the stereoscopic projection system of FIG. 6A.

Referring to FIGS. 6A through 6C, the directional screen 60 includes a holographic diffuser 165 to diffuse incident images along a first characteristic axis (a).

One image 167 is exemplary shown among the plurality of images projected from the projector array 50 toward the directional screen 60. While passing through the holographic diffuser 165, the image 167 is diffused at an angle θ along the first characteristic axis (a) without diffusion along the second characteristic axis (b). Therefore, the image 167 has an elliptical section at the exit pupil position 71. An axis Y is parallel to the arrangement direction of the projector array 50, along which the projectors are disposed, and an axis X is perpendicular to the axis Y. The first characteristic axis (a) is inclined at an angle φ with respect to the Y-axis.

Edges of the holographic diffuser 165 may be aligned with the axes X and Y as shown in FIG. 6B or be aligned with the first characteristic axis (a) and the second characteristic axis (b) as shown in FIG. 6C. The first characteristic axis (a) forms the angle φ with the Y-axis.

Referring to FIG. 6B, the holographic diffuser 165 is made by cutting a diffusing material sheet. The cutting of the diffusing material sheet is carried out such that a diffusing direction (α) of the holographic diffuser 165 is the same as the first characteristic axis (a) when horizontal edges of the holographic diffuser 165 are parallel with the X-axis. Referring to FIG. 6C, the cutting of the diffusing material sheet is carried out such that a diffusing direction (β) of the holographic diffuser 165 is aligned with the vertical edges of the holographic diffuser 165. In this case, the diffusing direction (β) can be the same as the first characteristic axis (a) by placing the holographic diffuser 165 at an angle φ to the Y-axis.

A light shaping diffuser (LSD) may be used for the holographic diffuser 165. For example, the LSD may be produced by PHYSICAL OPTICAL CORP. The structure of the holographic diffuser 165 will not be described in detail because it is well known.

Figure 7A:
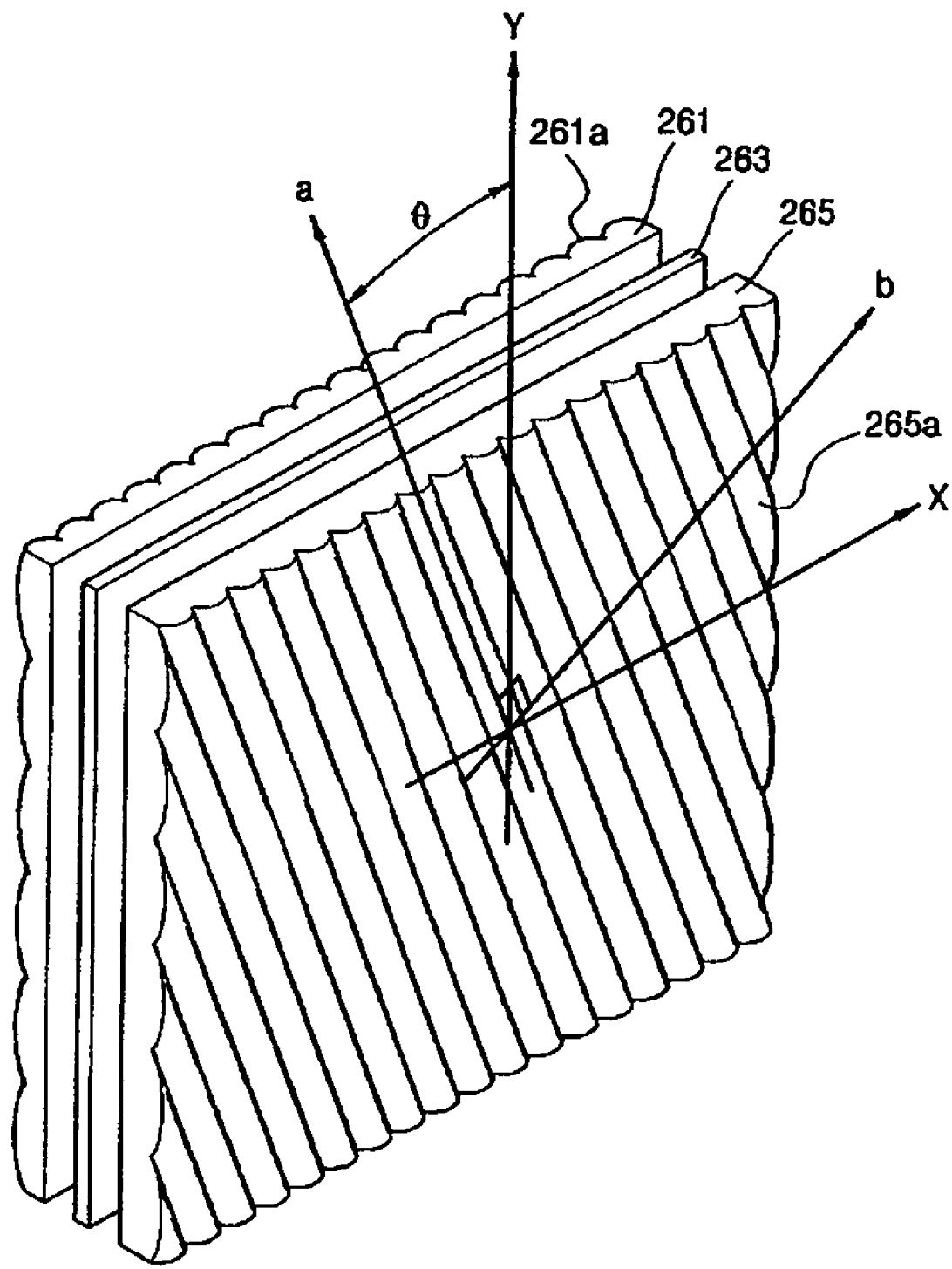
FIG. 7A is a schematic perspective view of a directional screen of a stereoscopic projection system according to another embodiment of the present general inventive concept.
Figure 7B:
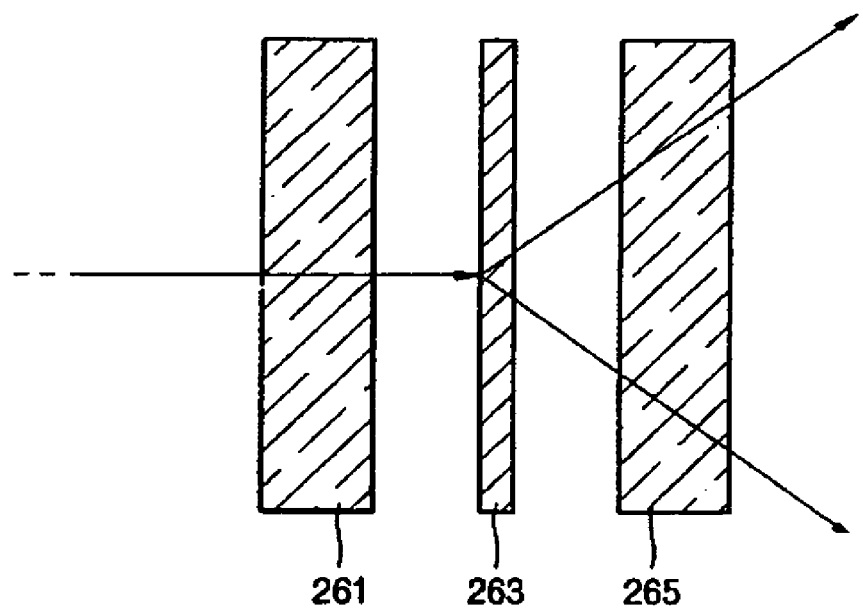
FIG. 7B is a sectional view taken along a first characteristic axis of the directional screen of FIG. 7A.
Figure 7C:
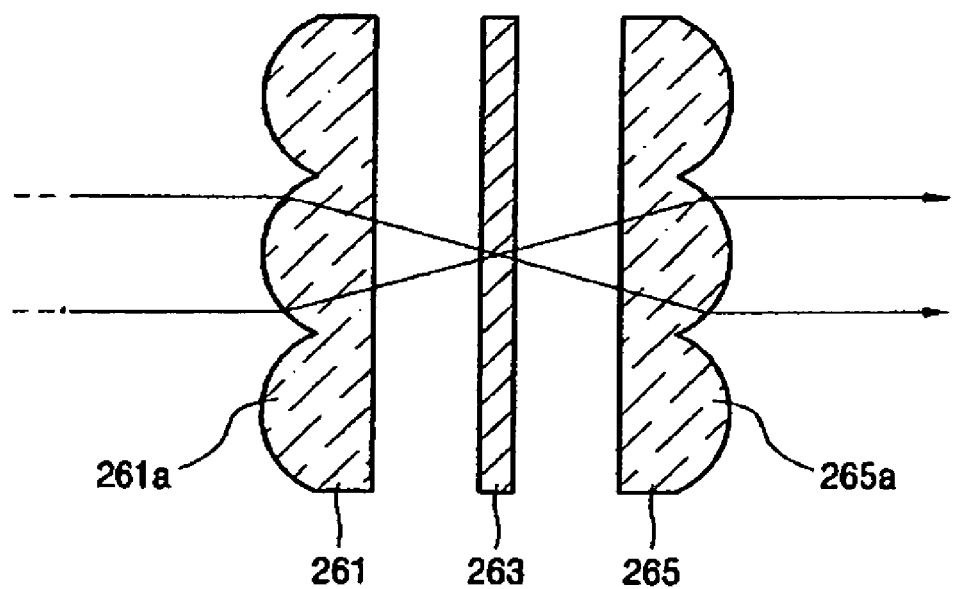
FIG. 7C is a sectional view taken along a second characteristic axis of the directional screen of FIG. 7A.

FIG. 7A is a schematic perspective view of a directional screen of a stereoscopic projection system according to another embodiment of the present general inventive concept, FIG. 7B is a partial sectional view taken along a first characteristic axis (a) of the directional screen illustrated in FIG. 7A, and FIG. 7C is a partial sectional view taken along a second characteristic axis (b) of the directional screen illustrated in FIG. 7A.

Referring to FIG. 7A through 7C, the directional screen includes a first lenticular sheet 261, a second lenticular sheet 265, and a diffuser 263 interposed between the first and second lenticular sheets 261 and 265.

The first lenticular sheet 261 includes a plurality of adjoining cylinder lenses 261a that are arranged along the second characteristic axis (b). The first lenticular sheet 261 transmits incident images along the first characteristic axis (a) and condenses the incident images along the second characteristic axis (b) as shown in FIGS. 7B and 7C.

The diffuser 263 is disposed in a plane where focal points of the cylinder lenses 261a are located. Since the images incident along the first characteristic axis (a) upon the diffuser 263 are parallel, they are diffused along (toward) the first characteristic axis (a) by the diffuser 263. In contrast, the images incident along the second characteristic axis (b) are focused on the diffuser 263 and then automatically diffused. In other words, the diffusion along the second characteristic axis (b) is not done by the diffuser 263.

The second lenticular sheet 265 is disposed to face the diffuser 263. The second lenticular sheet 263 includes a combination of adjoining cylinder lenses 265a that are arranged along the second characteristic axis (b). The second lenticular sheet 265 transmits the incident images along the first characteristic axis (a) and condenses the incident images along the second characteristic axis (b) as shown in FIGS. 7B and 7C. Therefore, after passing through the first lenticular sheet 261, the diffuser 263, and the second lenticular sheet 265, the shapes of the incident images become elliptical as shown in FIG. 4 due to the diffusion along the first characteristic axis (a) and the condensation along the second characteristic axis (b).

Figure 8:
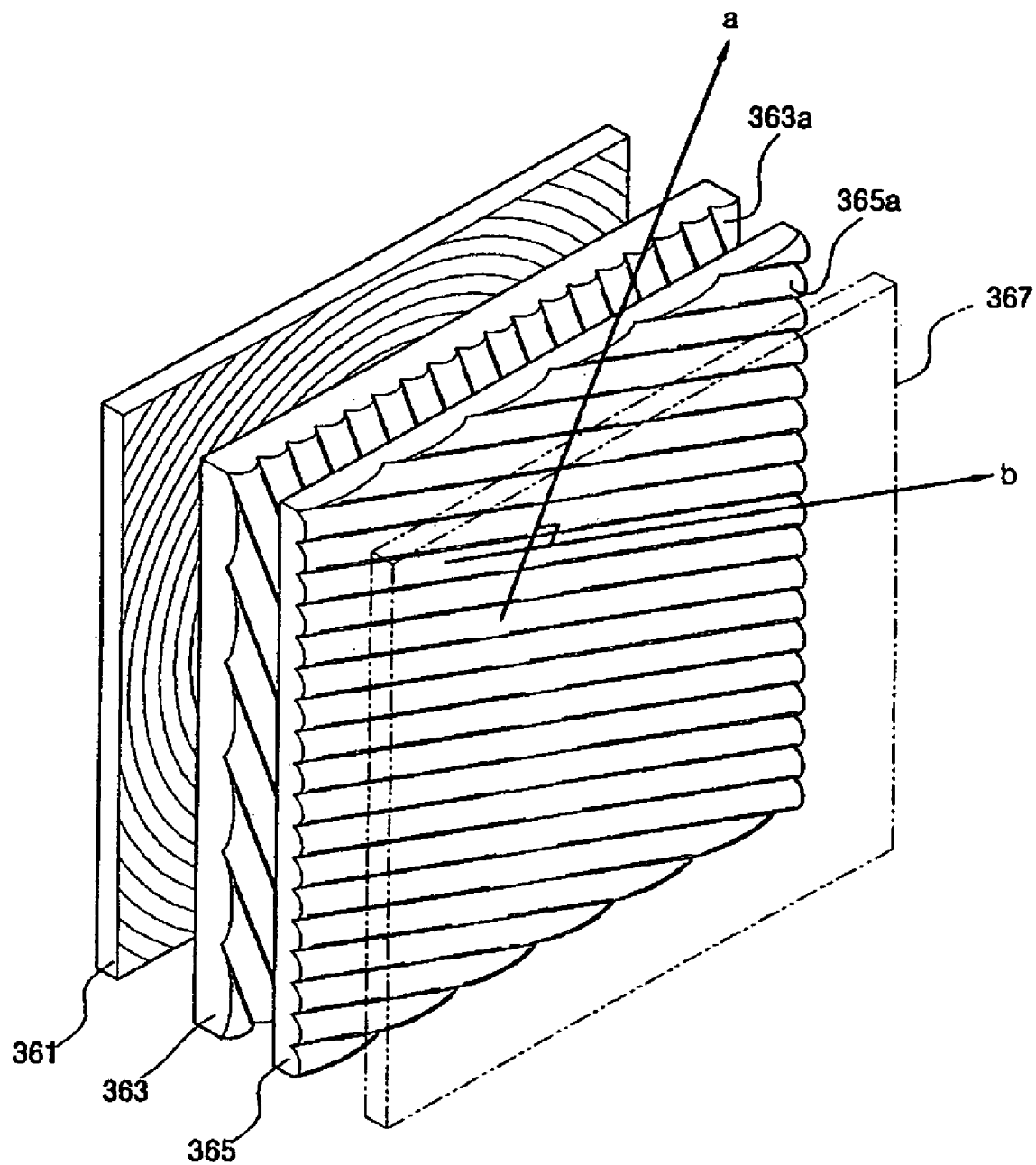
FIG. 8 is a schematic perspective view of a directional screen of a stereoscopic projection system according to another of the present general inventive concept.

FIG. 8 is a schematic perspective view of a directional screen of a stereoscopic projection system according to another embodiment of the present general inventive concept.

Referring to FIGS. 1, 3 and 8, the directional screen includes at least one Fresnel lens 361, a first lenticular sheet 363, and a second lenticular sheet 365. The Fresnel lens 361 condenses the incident images from the projector array 50.

The first lenticular sheet 363 is disposed beside the Fresnel lens 361 to transmit the incident images along the first characteristic axis (a) and to condense the incident images along the second characteristic axis (b). For this purpose, the first lenticular sheet 363 includes a plurality of adjoining cylinder lenses 363a that are arranged along the second characteristic axis (b).

The second lenticular sheet 365 is disposed beside the first lenticular sheet 363. The second lenticular sheet 365 transmits the incident images along the second characteristic axis (b). Also, the second lenticular sheet 365 condenses the incident images along the first characteristic axis (a). For this purpose, the second lenticular sheet 365 includes a plurality of adjoining cylinder lenses 365a that are arranged along the first characteristic axis (a).

The structure of the directional screen 60 described above enables the incident image to be widened in the direction of the first characteristic axis (a) and narrowed in the direction of the second characteristic axis (b). In this embodiment, the directional screen 60 may further include a second Fresnel lens 367 to condense the image passing through the second lenticular sheet 365.

Hereinafter, an operation of the stereoscopic projection system according to an embodiment of the present general inventive concept will be described with reference to FIGS. 3 and 4.

According to the Gauss lens formula, the viewing distance $L_V'$ between the viewer 75 and the screen 60 can be expressed by Equation 1:

$$L_V' = \frac{1}{1/F - 1/L_P'} \quad \text{[Equation 1]}$$

where F is a focal length of the Fresnel lens 61 of the directional screen 60, and $L_P'$ is the projecting distance.

The first characteristic axis (a) of the directional screen 60 is inclined at the angle $\phi$ to the arrangement direction of the image projectors $P_{21}, P_{22} \ldots P_{2N}$, such that the images at the exit pupil position 71 can be widened in the direction of the first characteristic axis (a). Therefore, the viewer 75 located at the viewing area can view all exit pupil images that are horizontally distributed, in spite of a vertical arrangement of the image projectors $P_{21}, P_{22} \ldots P_{2N}$.

The diffusing angle $\theta$ (shown in FIG. 6A) of the image along the first characteristic axis (a) may satisfy Inequality 1:

$$\theta > \tan^{-1}\left\{\frac{K' P_A'(N-1)}{2L_V' \cos\Phi}\right\} \quad \text{[Inequality 1]}$$

where $\phi$ is the inclined angle of the first characteristic axis (a), $L_V'$ is the viewing distance between the viewer 75 and the screen 60, and N is the number of the image projectors.

For example, in case K'=2, $P_A'$=200 mm, N=4, $L_V'$=3600, $\phi$=9.23 degrees, the diffusing angle $\theta$ may be set above 18.7 degrees to provide all exit pupil images within the viewing zones.

Further, the inclined angle $\phi$ of the first characteristic axis (a) with respect to the arrangement direction of the image projectors $P_{21}, P_{22} \ldots P_{2N}$ is equal to Equation 2:

$$\phi = \pm\tan^{-1}\left\{\frac{P_D'}{K' \cdot P_A'}\right\} \quad \text{[Equation 2]}$$

where $P_D'$ is the distance between the viewing zones, and K' is the magnification power of the directional screen and it is equal to the viewing distance $L_V'$ divided by a projecting distance $L_P'$ (K'=$L_V'/L_P'$), Therefore, a desired value can be selected for the inclined angle $\phi$ by changing $P_D'$, K', and $P_A'$. For example, in a case of K'=2 and $P_A'$=50 mm, the distance $P_D'$ can be set to 3 mm by selecting the angle $\phi$ as 1.72 degrees. For another example, in case K'=2 and $P_A'$=100 mm, the distance $P_D'$ can be set to 10 mm by selecting the angle $\phi$ as 2.86 degrees. For a further another example, in case K'=2 and $P_A'$=200 mm, the distance $P_D'$ can be set to 65 mm by selecting the angle $\phi$ as 9.23 degrees.

The angle $\phi$ can be fixed to a predetermined value. The directional screen 60 can also be controlled to rotate changing the setup value of the distance $P_D'$.

According to the stereoscopic projection system of the present general inventive concept, the image projectors are vertically arranged, and the improved directional screen is capable of changing the image diffusion direction, such that the distance between the viewing zones can be minimized without reducing the distance between the image projectors. Further, the distance between the viewing zones can be adjusted for the smooth image change without rearranging the image projectors. In addition, the distance between viewing zones can be adjusted by controlling the rotation of the directional screen.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A stereoscopic projection system comprising:
   a projector array having a plurality of image projectors arranged substantially along an arrangement direction perpendicular to a connecting line between left and right eyes of a viewer; and
   a directional screen having a first optical characteristic axis aligned at an angle with respect to the arrangement direction of the projector array and a second optical characteristic axis perpendicular to the first optical characteristic axis, to cause a plurality of images projected from the projector array to be relatively widened along the first optical characteristic axis and relatively narrowed along the second optical characteristic axis.

2. The stereoscopic projection system of claim 1, wherein the image projectors are arranged to project the plurality of images at exit pupils positions spaced apart from each other by a pitch, and the angle of the first optical characteristic axis with respect to the arrangement direction of the projector array satisfies an equation:

$$\phi = \pm\tan^{-1}\left\{\frac{P'_D}{K' \cdot P'_A}\right\}$$

where $\phi$ is the angle of the first optical characteristic axis with respect to the arrangement direction of the projector, $P'_D$ is a distance between viewing zones, $K'$ is a magnification power of the directional screen, and $P'_A$ is a distance between the image projectors.

3. The stereoscopic projection system of claim 1, wherein the directional screen comprises:
at least one Fresnel lens to condense the images projected from the projector array; and
a lenticular sheet disposed beside the Fresnel lens to diffuse incident images along the first optical characteristic axis.

4. The stereoscopic projection system of claim 3, wherein the lenticular sheet transmits the incident images along the second optical characteristic axis, and condenses and diffuses the incident images along the first optical characteristic axis, and the lenticular sheet comprises a plurality of adjoining cylinder lenses that are stacked along the first optical characteristic axis.

5. The stereoscopic projection system of claim 1, wherein the directional screen comprises a holographic diffuser disposed beside the projector array to diffuse the images along the first characteristic axis.

6. The stereoscopic projection system of claim 1, wherein the directional screen includes:
a first lenticular sheet to transmit the images along the first characteristic axis and to condense the images along the second characteristic axis;
a diffuser disposed at a focal point of the first lenticular sheet, to diffuse the images to widen the incident image along the first characteristic axis; and
a second lenticular sheet disposed to face the diffuser to condense the images along the second characteristic axis.

7. The stereoscopic projection system of claim 6, wherein each of the first and second lenticular sheets condenses the images along the second characteristic axis and transmits the images along the first characteristic axis, and each of the first and second lenticular sheets comprises a plurality of adjoining cylinder lenses that are arranged along the second characteristic axis.

8. The stereoscopic projection system of claim 1, wherein the directional screen comprises:
at least one Fresnel lens to condense the images projected from the projector array;
a first lenticular sheet disposed beside the Fresnel lens to transmit the images along the first characteristic axis and condense the incident images along the second characteristic axis; and
a second lenticular sheet disposed beside the first lenticular sheet to transmit the images transmitted through the first lenticular sheet along the second characteristic axis, and to condense and diffuse the images along the first characteristic axis.

9. The stereoscopic projection system of claim 8, wherein the first lenticular sheet comprises a plurality of first adjoining cylinder lenses that are arranged along the second characteristic axis, and the second lenticular sheet comprises a plurality of second adjoining cylinder lenses that are arranged along the first characteristic axis.

10. The stereoscopic projection system of claim 2, wherein the directional screen comprises:
at least one Fresnel lens to condense the images projected from the projector array; and
a lenticular sheet disposed beside the Fresnel lens to diffuse incident images along the first optical characteristic axis.

11. The stereoscopic projection system of claim 10, wherein the lenticular sheet transmits the incident images along the second optical characteristic axis, and condenses and diffuses the incident images along the first optical characteristic axis, and the lenticular sheet comprises a plurality of adjoining cylinder lenses that are arranged along the first optical characteristic axis.

12. A stereoscopic projection system comprising:
a projector array having a plurality of image projectors arranged in an arrangement direction to generate a plurality of images; and
a directional screen to receive the images and to widen the images in a first optical characteristic axis having a first angle with the arrangement direction, and to narrow the images in a second optical characteristic axis having a second angle with the arrangement direction, the second optical characteristic axis being perpendicular to the first optical characteristic axis.

13. The stereoscopic system of claim 12, wherein the first angle is smaller than the second angle.

14. The stereoscopic system of claim 12, wherein the first angle is opposite to the second angle with respect to the arrangement direction.

15. The stereoscopic system of claim 12, wherein the first angle is formed in a first direction with respect to the aligned direction, and the second angle is formed in a second direction with respect to the arrangement direction.

16. The stereoscopic system of claim 12, wherein the directional screen controls the images to be diffused in the first optical characteristic axis.

17. The stereoscopic system of claim 12, wherein the directional screen comprises:
a focusing layer to condense the plurality of images projected from the projector array; and
at least one lenticular sheet to diffuse the plurality of images along the first optical characteristic axis.

18. The stereoscopic system of claim 17, wherein
the at least one lenticular sheet a plurality of adjoining cylinder lenses that are arranged along the first optical characteristic axis, and
the at least one lenticular sheet is cut and positioned such as edges of the at least one lenticular sheet are parallel to the first optical characteristic axis, or the edges of the at least one lenticular sheet are parallel to the arrangement direction.

19. The stereoscopic system of claim 12, wherein the at least one lenticular sheet rotates and the first optical characteristic axis is rotated with respect to the arrangement axis.

20. A stereoscopic projection system comprising:
a projector array having a plurality of image projectors arranged in an arrangement direction to generate a plurality of images; and a directional screen to receive the images, and to control the images to be diffused in a first optical characteristic axis having a first angle with the arrangement direction and not to be diffused in a second optical characteristic axis having a second angle with the arrangement direction, the second optical characteristic axis being perpendicular to the first optical characteristic axis, wherein the images are relatively widened along the along the first optical characteristic axis and relatively narrowed along the second optical characteristic axis.

21. A directional screen unit usable with a stereoscopic projection system, the directional screen comprising:

a directional screen having a first optical characteristic axis and a perpendicular second optical characteristic axis, the directional screen to receive images from a plurality of projectors aligned vertically with respect to a viewer, to control the images to be relatively widened along the first optical characteristic axis and relatively narrowed along the second optical characteristic axis.

* * * * *

UNITED STATES PATENT AND TRADEMARK OFFICE
CERTIFICATE OF CORRECTION

PATENT NO. : 7,648,243 B2  Page 1 of 1
APPLICATION NO. : 11/294381
DATED : January 19, 2010
INVENTOR(S) : Shestak et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-eighth Day of December, 2010

David J. Kappos
*Director of the United States Patent and Trademark Office*